United States Patent
Harris (10) Patent No.: US 10,227,264 B2
(45) Date of Patent: Mar. 12, 2019

(54) METHOD FOR MAKING CERAMIC MATRIX COMPOSITE ARTICLES

(71) Applicant: Rolls-Royce High Temperature Composites, Inc., Huntington Beach, CA (US)

(72) Inventor: Stephen Isaiah Harris, Long Beach, CA (US)

(73) Assignee: Rolls-Royce High Temperature Composites, Inc., Cypress, CA (US)

( * ) Notice: Subject to any disclaimer, the term of this patent is extended or adjusted under 35 U.S.C. 154(b) by 369 days.

(21) Appl. No.: 14/798,019

(22) Filed: Jul. 13, 2015

(65) Prior Publication Data

US 2017/0044069 A1 Feb. 16, 2017

(51) Int. Cl.
| | |
|---|---|
| C04B 35/00 | (2006.01) |
| C04B 35/80 | (2006.01) |
| C04B 35/573 | (2006.01) |
| C04B 35/626 | (2006.01) |
| C04B 35/628 | (2006.01) |
| C04B 35/624 | (2006.01) |

(Continued)

(52) U.S. Cl.
CPC .......... *C04B 35/806* (2013.01); *C04B 35/573* (2013.01); *C04B 35/624* (2013.01); *C04B 35/6269* (2013.01); *C04B 35/6286* (2013.01); *C04B 35/62847* (2013.01); *C04B 35/62849* (2013.01); *C04B 35/62852* (2013.01); *C04B 35/62855* (2013.01); *C04B 35/62857* (2013.01); *C04B 35/62863* (2013.01); *C04B 35/62865* (2013.01); *C04B 35/62868* (2013.01); *C04B 35/62871* (2013.01); *C04B 35/62873* (2013.01); *C04B 35/62884* (2013.01);

(Continued)

(58) Field of Classification Search
CPC .................................................. C04B 35/624
See application file for complete search history.

(56) References Cited

U.S. PATENT DOCUMENTS

| | | |
|---|---|---|
| 3,632,385 A | 1/1972 | Schmitt et al. |
| 4,833,030 A | 5/1989 | Petersen |

(Continued)

FOREIGN PATENT DOCUMENTS

EP 3000797 A1 3/2016

OTHER PUBLICATIONS

Extended Search Report from counterpart European Application No. 16179001.9, dated Nov. 30, 2016, 9 pp.

(Continued)

*Primary Examiner* — Robert A Vetere
(74) *Attorney, Agent, or Firm* — Shumaker & Sieffert, P.A.

(57) ABSTRACT

A method of forming a composite article may include impregnating an inorganic fiber porous preform with a first slurry composition. The slurry composition includes particles, a solvent, and a pre-gellant material. Gelling of the pre-gellant material in the slurry composition is initiated to substantially immobilize the particles and yield a gelled article. The method also includes impregnating the gelled article with a second solution that includes a high char-yielding component, and pyrolyzing the high char-yielding component to yield carbon and form a green composite article. The green composite article is then infiltrated with a molten metal or alloy infiltrant to form the composite article. The molten infiltrant reacts with carbon, and the final composite article may include less residual metal or alloy than a composite article formed without using the second solution.

17 Claims, 2 Drawing Sheets

(51) Int. Cl.
*C04B 35/64* (2006.01)
*C04B 35/65* (2006.01)
*C23C 2/04* (2006.01)

(52) U.S. Cl.
CPC ........ *C04B 35/62894* (2013.01); *C04B 35/64* (2013.01); *C04B 35/65* (2013.01); *C23C 2/04* (2013.01); *C04B 2235/3826* (2013.01); *C04B 2235/428* (2013.01); *C04B 2235/48* (2013.01); *C04B 2235/524* (2013.01); *C04B 2235/5224* (2013.01); *C04B 2235/5228* (2013.01); *C04B 2235/5236* (2013.01); *C04B 2235/5244* (2013.01); *C04B 2235/5248* (2013.01); *C04B 2235/6023* (2013.01); *C04B 2235/616* (2013.01); *C04B 2235/656* (2013.01); *C04B 2235/6562* (2013.01); *C04B 2235/728* (2013.01)

(56) References Cited

U.S. PATENT DOCUMENTS

| | | | |
|---|---|---|---|
| 5,336,522 A | 8/1994 | Balhadere et al. | |
| 5,628,938 A | 5/1997 | Sangeeta et al. | |
| 5,945,166 A * | 8/1999 | Singh | C04B 35/573 427/255.12 |
| 6,024,898 A | 2/2000 | Steibel et al. | |
| 6,051,167 A | 4/2000 | Withers et al. | |
| 6,258,737 B1 | 7/2001 | Steibel et al. | |
| 6,277,440 B1 | 8/2001 | Reynolds | |
| 7,736,554 B2 | 6/2010 | Thebault et al. | |
| 7,799,375 B2 | 9/2010 | Rashed et al. | |
| 8,039,053 B2 | 10/2011 | Philippe et al. | |
| 8,142,845 B2 | 3/2012 | Rashed et al. | |
| 2004/0192534 A1 | 9/2004 | Nixon et al. | |
| 2006/0003098 A1 * | 1/2006 | Rashed | C04B 35/573 427/228 |
| 2011/0150663 A1 * | 6/2011 | Manicke | C04B 35/573 416/241 B |
| 2013/0167374 A1 | 7/2013 | Kirby et al. | |
| 2013/0287941 A1 | 10/2013 | Gray | |

OTHER PUBLICATIONS

Response to Extended European Search Report dated Nov. 30, 2016, from counterpart European Application No. 16179001.9, filed Jun. 5, 2017, 6 pp.

* cited by examiner

METHOD FOR MAKING CERAMIC MATRIX COMPOSITE ARTICLES

BACKGROUND

Reinforced ceramic matrix composite articles (CMCs) are well suited for high temperature structural applications because of their toughness, thermal resistance, high temperature strength and chemical stability. To make a CMC article, fiber is initially shaped to create a porous preform, the porous preform is rigidized with a ceramic phase(s), and the porosity is filled with a ceramic slurry bonded by a molten alloy infiltrant.

For example, silicon carbide (SiC) matrix composites have been made by infiltrating a silicon carbide slurry into a porous fiber preform to form a green composite article. A molten alloy infiltrant material including silicon (Si) may then be introduced into the green composite article using capillary forces to densify the structure to less than about 5% porosity and form a CMC article.

SUMMARY

In some examples, the disclosure describes a method that includes impregnating an inorganic fiber porous preform with a first slurry composition. The first slurry composition may include ceramic particles, a solvent, and a pre-gellant material. The method may further include initiating gelation of the pre-gellant material in the first slurry composition to substantially immobilize the particles and yield a gelled article. In some examples, the method also includes impregnating the gelled article with a second solution, where the second solution comprises a high char-yielding component, and pyrolyzing the high char-yielding component to yield carbon and form a green composite article. The method additionally may include infiltrating the green composite article with a molten metal alloy to form a final composite article. At least some of the molten metal or alloy may react with the carbon to form a metal carbide.

In some examples, the disclosure describes a method that includes impregnating a silicon carbide fiber porous preform with a first slurry composition. The first slurry composition may include silicon carbide particles, a solvent, and a pre-gellant material. The method also may include initiating gelation of the pre-gellant material in the first slurry composition to substantially immobilize the silicon carbide particles and yield a gelled article. According to these examples, the method further may include impregnating the gelled article with a second solution, where the second solution comprises furfuryl alcohol, and pyrolyzing the furfuryl alcohol to yield carbon and form a green composite article. The method additionally may include infiltrating the green composite article with a molten material infiltrant comprising silicon to form a final composite article. At least some of the silicon may react with the carbon to form silicon carbide.

The details of one or more examples are set forth in the accompanying drawings and the description below. Other features, objects, and advantages will be apparent from the description and drawings, and from the claims.

DETAILED DESCRIPTION

The disclosure describes techniques for forming composite articles. In accordance with examples of this disclosure, the techniques may include infiltrating an inorganic fiber porous preform with a first slurry composition including ceramic particles. After the first infiltration is complete, the technique may include infiltrating the inorganic fiber porous preform with a second solution including a high char-yielding component. When pyrolyzed, the high char-yielding component may produce carbon, which remains in pores of the inorganic fiber porous preform. After the second infiltration step is complete, the high char-yielding component may be pyrolyzed to form carbon, and the inorganic fiber porous preform may be subjected to a melt infiltration with a metal or alloy. The molten metal or alloy may react with the carbon from the high char-yielding component, forming a metal carbide. Due to the volume occupied by the carbon, the reaction between the carbon and the molten metal, or both, an amount of residual metal in the final composite article may be reduced compared to a final composite article formed without the second infiltration with the second solution. Reducing the amount of residual metal in the final composite article may at least one of improve mechanical properties of the final composite article, improve surface finish of the final composite article, or reduce residual stress in the final composite article.

Infiltrating the high char-yielding component into the inorganic fiber porous preform in a separate solution from the particles may allow separate tailoring of the first slurry composition and the second solution. For example, if the high char-yielding component were to be included in the first slurry composition, it may be difficult to achieve a desired particle loading in the first slurry composition, which may result in fewer particles being deposited in the inorganic porous preform. As another example, certain additives, such as dispersants, that may be used in the first slurry composition to facilitate particle loading may not be suitable for use with the high char-yielding component. In this way, separating the first slurry composition including particles and the second solution including the high char-yielding component may allow for desired loading of both particles and the high char-yielding component into the inorganic fiber porous preform, and may ultimately decrease the amount of residual metal in the final composite article compared to a composite article formed without using the high char-yielding component, or formed by including the particles and the high char-yielding component in a single slurry and infiltration step.

Figure 1:
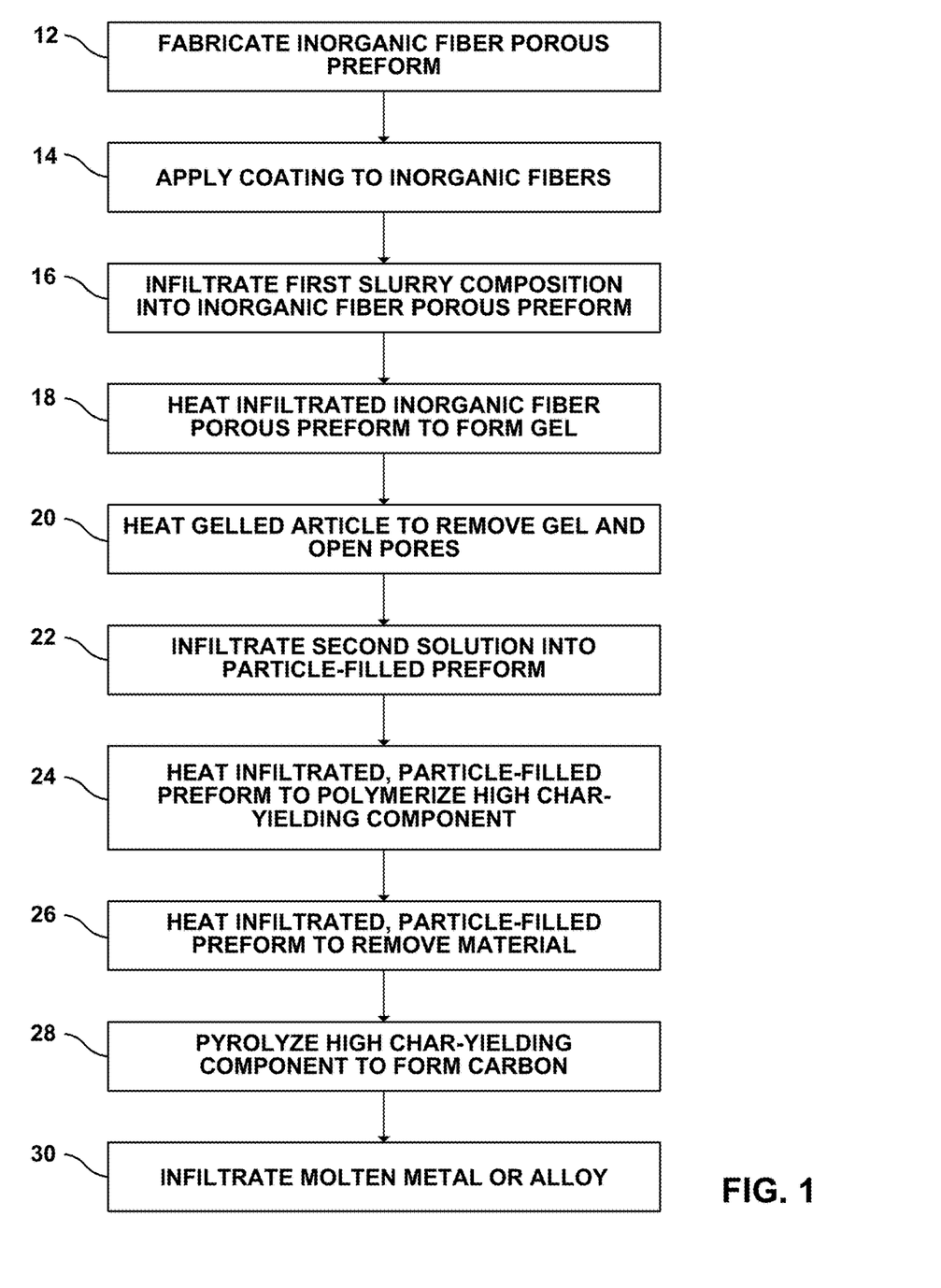
FIG. 1 is a flow diagram illustrating an example technique for forming a composite article using a first slurry composition infiltration and a second solution infiltration.

FIG. 1 is a flow diagram illustrating an example technique for forming a composite article using a first slurry composition infiltration and a second solution infiltration. The technique of FIG. 1 may include fabricating a two-dimensional or three-dimensional inorganic fiber preform (12), which forms a structural scaffold for subsequent infiltration with a ceramic matrix. To fabricate the inorganic fiber preform, chopped fibers, continuous fibers, woven fabrics or combinations thereof are laid up, fixed and shaped into the configuration of a desired component. In some examples, inorganic fibers or precursors of inorganic fibers may be three-dimensional woven into the configuration of the desired component, or two-dimensional woven or non-woven plys may be stacked and optionally needled together into the configuration of the desired components.

The fibers in the inorganic fiber preform may be made from any inorganic material that is stable at processing temperatures above about 1000° C. and is compatible with the temperature of the molten alloy infiltrant. Example inorganic fibers include, but are not limited to, aluminum oxide ($Al_2O_3$), mullite ($Al_6Si_2O_{13}$), zirconium oxide ($ZrO_2$), carbon (C), graphite, silicon carbide (SiC), silicon carbon nitride, silicon nitride, and mixtures and combinations thereof. Suitable commercially available inorganic fibers include, for example, pre-ceramic SiC fibers such as those available under the trade designation HI-NICALON and SYLRAMIC from COI Ceramics, Inc., San Diego, Calif.

In some examples, after fabricating the inorganic fiber preform, the inorganic fibers in the preform may be treated by applying a coating or coatings to the inorganic fibers (14). The coating or coatings may, for example, provide a compliant layer at an interface between the inorganic fibers and a subsequently formed matrix. The compliant layer may enhance toughness and crack deflection in the final composite article, reduce or substantially prevent reaction of the reinforcing fibers with a molten alloy infiltrant, or both. Example coatings include, but are not limited to, carbon, aluminum nitride, boron nitride, silicon nitride, silicon carbide, boron carbide, a metal boride, a transition metal silicide, a transition metal oxide, a transition metal silicate, a rare earth metal silicate, and mixtures and combinations thereof. If used, in some examples, the coating or coatings has a thickness of between about 0.05 μm and 15 μm, or between about 0.1 μm and about 5 μm. In some examples, the coating or coatings may be applied to the inorganic fibers using chemical vapor deposition/chemical vapor infiltration (CVD/CVI).

Once the inorganic fiber porous preform is shaped (12) and optionally rigidized (14), the technique of FIG. 1 includes infiltrating a first slurry composition into the inorganic fiber porous preform (16). As the first slurry composition flows into the interstices between the inorganic fibers of the porous preform, particles in the first slurry composition may substantially uniformly (e.g., uniformly or nearly uniformly) impregnate the pores of the porous preform and come to reside in the interstices between the preform inorganic fibers.

In some examples, the first slurry composition includes particles, a pre-gellant material, an optional gelation initiator or promoter, optional additives, and a solvent. The particles in the slurry may include a ceramic, such as at least one of aluminum nitride, aluminum diboride, boron carbide, aluminum oxide, mullite, zirconium oxide, carbon, silicon carbide, silicon nitride, a transition metal nitride, a transition metal boride, a transition metal oxide, a transition metal silicate, or a rare earth oxide. The size of the particles may vary widely. In some examples, the particles may define a major dimension of less than about 50 μm. In some examples, the particles may include one or more of regular or irregular shapes including, for example, spheres, rods, disks, and the like. In some examples, the major dimension of the particles may form a monomodal, a bimodal, or a multimodal distribution. In some examples, the particles include spheres defining a diameter of less than about 50 μm, and the diameters of the particles make up a multimodal distribution to effectively flow between the inorganic fibers of the porous preform and pack densely within the pores of the porous preform.

The first slurry composition may also include a pre-gellant material. The pre-gellant material may include any material that can be processed to form a gel-like network within the interstices between the inorganic fibers of the porous preform to substantially evenly (e.g., evenly or nearly evenly) distribute and effectively retain the particles within the porous preform as the porous preform is subsequently processed. In this application, the term gel refers to a viscous, jelly-like colloid including a disperse phase of the particles.

In some examples, the pre-gellant material includes a polysaccharide such as, for example, at least one of methyl cellulose, carboxymethyl cellulose, hydroxypropyl methyl cellulose, gellan gum, agarose, or carrageenan. In some examples, the slurry composition may optionally further include a gelation initiator or promoter such as a monovalent or a divalent salt.

In some examples, the pre-gellant material includes one or more gelation monomers which, when polymerized, form a gel within the pores of the porous preform. The monomeric pre-gellant material may include, but are not limited to, at least one of an acrylamide, an acrylate, a vinyl, or an allyl. The gelation monomers may optionally include one, two, or more functional groups such as, for example, (meth)acryl, acrylamido, vinyl, allyl, or the like.

In some examples, the first slurry composition may include an optional polymerization initiator to aid gelation of the pre-gellant material. The polymerization initiator may vary widely depending on the selected monomeric pre-gellant material, and in some examples may include at least one of a peroxide, a persulfate, a perchlorate, an amine, or an azo compound.

In some examples, the monomeric pre-gellant material may include at least one first monomeric material that polymerizes to produce linear polymer chains, and at least one second monomeric material that polymerizes to produce cross-links between the linear polymer chains and further aid gelation. For example, the first monomeric material may include N,N-dimethylacrylamide (DMAA, which produces linear polyacrylamide chains), and the second monomeric material may include N,N'-methylenebisacrylamide (MBAM), which crosslinks between the linear chains.

The first and the second monomeric materials making up the monomeric pre-gellant material may be present in the first slurry composition in any suitable ratio, and considerations in selecting the ratio include solubility in a selected slurry solvent, gelation temperatures, the desired viscosity of the slurry, consistency and viscosity of the resultant gelled slurry, gelation time, and the like. In some examples, the first monomeric material DMAA and the second monomeric material MBAM may be present in the first slurry composition at a ratio of about 1:1 to about 1:30 by weight.

In some examples in which the first slurry composition includes first monomer DMAA and second monomer MBAM discussed above, a polymerization initiator includes 2,2'-Azobis[2-(2-imidazoline-2-yl)propane] 2HCl (AZIP). Other examples of polymerization initiators include free radical initiators, such as ammonium persulfate/tetramethyl ethylene diamine (APS-TEMED), and azobis (2-amidinopropane) HCl (AZAP), and mixtures and combinations thereof.

The first slurry composition also may include a solvent selected to disperse or dissolve the monomeric pre-gellant material and the optional polymerization initiator and suspend the particles. In some examples, the solvent is aqueous (includes a major amount of water), or is water. Other solvents that can be used in the first slurry composition include, but are not limited to, alcohols.

In some embodiments, the first slurry composition may optionally include less than about 10 weight percent (wt. %) of one or more additive such as, for example, a dispersant, a binder, a surfactant, a pH adjustor, or the like.

In some examples, the first slurry composition may include between about 30 wt. % and about 90 wt. % of particles, between about 0.5 wt. % and about 30 wt. % of pre-gellant material, between about 0.1 wt. % and about 10 wt. % of a polymerization initiator, between about 0.25 wt. % and about 20 wt. % of one or more additives, and between about 10 wt. % and about 70 wt. % water.

In some examples, the particles including SiC, and the first slurry composition includes a SiC solids content of between about 60 wt. % and about 80 wt. %. In some examples, the SiC particles include coarse spherical particles with a diameter of about 15 μm and fine spherical particles with a diameter of about 1 μm.

To make the first slurry composition, the particles, the pre-gellant material, the solvent, and any optional polymerization initiator or other additives are combined and optionally milled to ensure that the particles are dispersed and have an appropriate shape and size to effectively flow, insert between, and lodge within the pores of the inorganic fiber porous preform. Properties of the slurry such as, for example, pH, temperature, and the like may optionally be adjusted before, during, or after the milling process.

Figure 2:
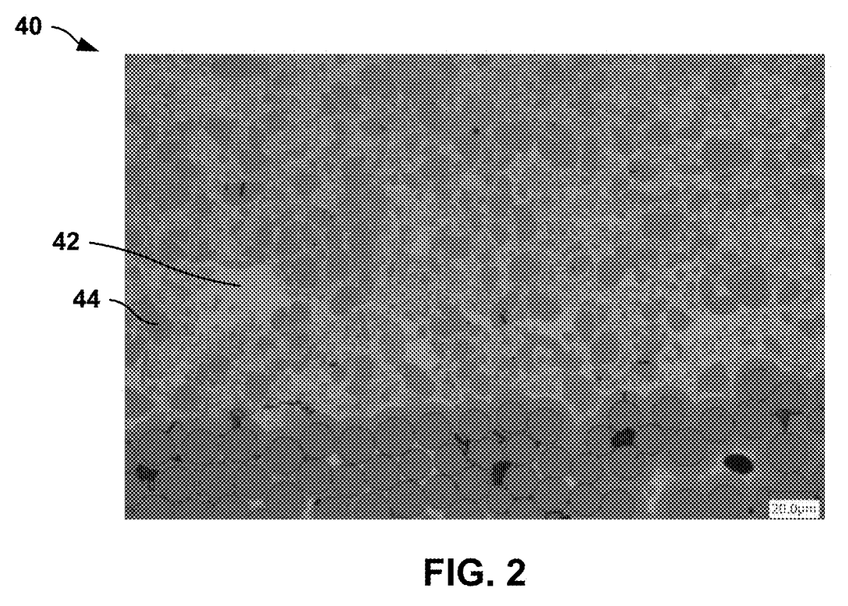
FIG. 2 is a cross-sectional micrograph of a comparative example SiC—SiC composite formed without a secondary infiltration of a solution including a high char-yielding component.

The technique of FIG. 2 may include infiltrating the first slurry composition into the inorganic fiber porous preform (16). To infiltrate the first slurry composition into the inorganic fiber porous preform (16), the inorganic fiber porous preform may be immersed in the first slurry composition. In some examples, prior to immersing the inorganic fiber porous preform in the first slurry composition, the inorganic fiber porous preform may optionally be prepared for slurry infiltration by exposing the inorganic fiber porous preform to a solution including, for example, at least one of water, a solvent, a surfactant, and the like to aid impregnation of the first slurry composition into the inorganic fiber porous preform.

In some examples, to facilitate infiltrating the first slurry composition into the inorganic fiber porous preform (16), the inorganic fiber porous preform may be disposed in a vacuum chamber, and a vacuum may optionally be drawn to purge gas from the inorganic fiber porous preform. In some examples, once the inorganic fiber porous preform is immersed in the first slurry composition, an external pressure, such as a pressure of about 1 atmosphere, may be applied to press the first slurry composition into pores of the inorganic fiber porous preform.

In some examples, instead of pulling a vacuum to facilitate infiltration of the first slurry composition into the inorganic fiber porous preform (16), resin transfer molding (RTM) may be used to infiltrate the first slurry composition into the inorganic fiber porous preform (16). In RTM, the first slurry is pumped into a mold enclosing the inorganic fiber porous preform under pressure, rather than under vacuum.

Infiltrating the first slurry composition into the inorganic fiber porous preform (16) may be conducted at any suitable temperature, such as room temperature (about 20° C. to about 35° C.).

In some examples, following infiltration of the first slurry composition (16), the infiltrated inorganic fiber porous preform may optionally be heated to increase the rate at which the pre-gellant materials at least partially form a gel in the interstices between the inorganic fibers (18). The temperature selected to cause gel formation may vary widely depending on the pre-gellation materials and polymerization initiators (if any) selected for use in the slurry composition. In some examples, the infiltrated inorganic fiber porous preform may be heated at a temperature of about 30° C. to about 80° C., or about 35° C. to about 45° C., to facilitate formation of the gel (18). The infiltrated inorganic fiber porous preform may be heated for a time sufficient to ensure that sufficient slurry gellation has occurred throughout the volume of the infiltrated inorganic fiber porous preform to substantially maintain (e.g., maintain or nearly maintain) the particles within pores of the infiltrated inorganic fiber porous preform during subsequent processing steps. In some examples, the infiltrated inorganic fiber porous preform may be heated at the temperature for between about 1 hour and about 4 hours, or between about 2 hours and about 3 hours. The resulting gelled article includes coated or uncoated inorganic fibers, particles, and the gel between the inorganic fibers.

In some examples, after the first slurry composition is sufficiently or fully gelled in the infiltrated inorganic fiber porous preform, excess gelled slurry may optionally be removed from the infiltrated inorganic fiber porous preform. The excess gelled slurry may be removed from the preform by any suitable method, and mechanical surface treatment techniques like brushing or polishing with an abrasive article may be used.

After optionally heating the infiltrated inorganic fiber porous preform to cause the pre-gellant materials to at least partially form the gel (18), the gelled article may be heat to remove the gel and open pores in the porous preform (20). For example, the gelled article may be heated to a temperature sufficient to burn, volatilize, or both the gel and other components present in pores of the porous preform (e.g., solvent, polymerization initiator, additives, or the like), while leaving the particles disposed in the pores. In some examples, the gelled article may be heated at a temperature between about 300° C. and about 500° C., such as about 400° C. to remove the gel and open pores. The gelled article may be heated for a time sufficient to substantially fully remove (e.g., fully remove or nearly fully remove) the gel and other components present in pores of the porous preform. For example, the gelled article may be heated for about 10 minutes to about 60 minutes, such as about 30 minutes. Removing the gel may leave a particle-filled porous preform.

The technique of FIG. 1 may include infiltrating a second solution into the particle-filled porous preform (22). The second solution may function as a carbon source, which deposits carbon in porous of the particle-filled porous preform. During subsequent infiltration of the preform with a molten metal, the carbon may react with the molten metal to form a metal carbide. This may reduce an amount of residual metal in the finished composite article, which may improve at least one of mechanical properties, surface finish, or residual stress in the finished composite article compared to a composite article that includes a higher level of residual metal.

The second solution may include, for example, a high char-yielding component, a solvent, and, optionally, at least one additive, such as a polymer interrupter, an acid catalyst, a secondary polymer, or the like. The high char-yielding component may include a material, such as a monomer, a polymer, or the like, that, when pyrolyzed, yields a high percentage of carbon. In some examples, the high char-yielding component may include a relatively low viscosity liquid, which may be polymerized after infiltration of the second solution into the particle-filled porous preform. By having a relatively low viscosity during the infiltration process, the second solution may more easily infiltrate into the interior pores of the particle-filled porous preform compared to a solution with a higher viscosity. This may facilitate deposition of carbon throughout substantially the entire (e.g., the entire or nearly the entire) volume of the particle-filled porous preform.

In some examples, the high char-yielding component may include a monomer or a short-chain polymer that may be polymerized after being infiltrated into the particle-filled porous preform. Polymerizing the high char-yielding component may result in the high char-yielding component being substantially retained within porous of the particle-filled porous preform during subsequent processing, such that the high char-yielding component does not flow out of the particle-filled porous preform.

In some examples, the high char-yielding component includes furfuryl alcohol, a short-chain polymer derived by polymerizing furfuryl alcohol, or a phenolic material, such as a phenolic resin carried by an organic solvent.

The second solution also may include a solvent. The solvent may be selected to dissolve or suspend the other components of the second solution, including the high char-yielding component and any additives. In some examples, the solvent may be aqueous (may include a major amount of water). In other examples, the solvent may be water. In some examples, the solvent may include a mixture of chemicals, such as water and another polar solvent, such as an alcohol or the like.

In some examples, the second solution includes at least one optional additive. The at least one optional additive may include, for example, a polymer interrupter. The polymer interrupter may slow or interrupt polymerization of the high char-yielding component. In this way, the polymer interrupter may control a rate of polymerization to allow infiltration of a partially polymerized second solution into the particle-filled porous preform, and may affect the molecular weight of the polymerized high char-yielding component. In some examples, the polymer interrupter includes an alcohol, such as isopropyl alcohol or the like.

In some examples, the at least one optional additive may include an acid catalyst. The acid catalyst catalyzes the polymerization reaction for the high char-yielding component. The particular acid catalyst used may depend upon the particular high char-yielding component. In some examples, such as some examples in which the high char-yielding component includes furfuryl alcohol, the acid catalyst may include nitric acid, hydrochloric acid, paratoluene sulfonic acid (PTSA), or the like.

In some examples, the at least one optional additive may include a secondary polymer. The secondary polymer may function as a pore forming agent. The secondary polymer may form a second phase or domains when the high char-yielding component is later polymerized within the particle-filled porous preform. When the infiltrated, particle-filled preform is later pyrolyzed to convert at least part of the high char-yielding component to carbon, the secondary polymer may burn or vaporize, leaving pores within the carbon formed by pyrolization of the high char-yielding component. These pores in the carbon may facilitate infiltration of the molten metal substantially throughout the volume of the porous preform. Further, the pores may facilitate more complete reaction between the molten metal and the carbon by exposing a greater surface area of carbon to the molten metal. Without pores in the carbon, less carbon may react with the molten metal, as a metal carbide layer may form on the carbon, which may prevent further reaction between the carbon and the molten metal. In some examples, the secondary polymer may include poly(ethylene glycol) (PEG), polyvinyl alcohol (PVA), polyvinyl pyrollidone (PVP), or any other high melting point, low char-yielding polymer.

In some examples, the second solution may include about 25 to about 90 wt. % high char-yielding component (e.g., furfuryl alcohol), about 8 to about 72 wt. % solvent (e.g., deionized water), about 0.5 to about 2.5 wt. % polymer interrupter (e.g., isopropyl alcohol), about 1.0 to about 10 wt. % secondary polymer (e.g., polyethylene glycol with an average molecular weight of about 1500 g/mol), and sufficient acid catalyst to catalyze polymerization of the high char-yielding component (e.g., sufficient 1 molar nitric acid to bring the second solution to a pH of about 2.0). In some examples, the second solution may include about 70 wt. % high char-yielding component, about 26 wt. % solvent, about 1.5 wt. % polymer interrupter, about 2.5 wt. % secondary polymer, and sufficient acid catalyst to catalyze polymerization of the high char-yielding component.

In some examples, prior to infiltrating the second solution into the particle-filled porous preform (22), the high char-yielding component may optionally be partially polymerized. The time and temperature used to partially polymerize the high char-yielding component may depend upon the composition of the second solution and the identity of the high char-yielding composition. In some examples, the second solution may be heated at a temperature of between about 40° C. and about 80° C. for between about 2 hours and about 24 hours to partially polymerize the high char-yielding component. For example, the second solution may be heated at a temperature of about 65° C. for about 2 hours to partially polymerize the high char-yielding component. In some examples, the partial polymerization of the high char-yielding component may cause the second solution to become opaque. After partially polymerizing the high char-yielding component, the second solution may be aged for a selected time. For example, the second solution may be aged at room temperature for a time between about 12 hours and about 36 hours.

Once the second solution has been prepared, the second solution may be infiltrated into the particle-filled porous preform (22) using at least one of vacuum pressure infiltration, RTM, slip casting, or the like. The temperature and pressure may be selected to infiltrate the second solution substantially throughout the volume (e.g., throughout the volume or nearly throughout the volume) of the particle-filled porous preform.

Once the second solution has been infiltrated into the particle-filled porous preform (22), the infiltrated, particle-filled preform to further polymerize the high char-yielding component (24). Polymerizing the high char-yielding component may substantially prevent the high char-yielding component from flowing out of the infiltrated, particle-filled preform during subsequent processing, such as heating of infiltrated, particle-filled preform. This may result in carbon being formed substantially throughout the volume (e.g., throughout the volume or nearly throughout the volume) of the infiltrated, particle-filled preform when the high char-yielding component is pyrolized. In some examples, the infiltrated, particle-filled preform may be heated at a temperature between about 50° C. and about 150° C. for a time between about 1 hour and about 48 hours to further polymerize the high char-yielding component (24). In some examples, the infiltrated, particle-filled preform may be heated at about 70° C. for about 24 hours to further substantially completely polymerize the high char-yielding component (24).

After the infiltrated, particle-filled preform has been heated to further polymerize the high char-yielding component (24), the infiltrated, particle-filled preform may be heated to a higher temperature to remove materials other than the inorganic fibers, the particles, and the polymerized high char-yielding component (26). For example, this heating may remove solvent, acid catalyst, secondary polymer, polymer interrupter, or the like, and may leave porosity in the infiltrated, particle-filled preform. In some examples, the infiltrated, particle-filled preform may be heated to a temperature of between about 200° C. to about 500° C. at a rate of between about 1° C. and about 5° C. per minute and held for about 15 minutes to about 60 minutes to remove materials other than the inorganic fibers, the particles, and the polymerized high char-yielding component (26) and begin the initial polymer reduction process.

The technique of FIG. 1 further includes pyrolyzing the high char-yielding component to form carbon, which remains in the infiltrated, particle-filled preform (28). In some examples, pyrolyzing the high char-yielding component to form carbon, which remains in the infiltrated, particle-filled preform (28) includes heating the infiltrated, particle-filled preform to a temperature of about 1000° C. to about 1200° C. at a rate of between about 1° C. per minute and about 5° C. per minute under a vacuum or inert atmosphere. During the pyrolyzing, the high char-yielding component releases the atoms other than carbon, which are volatilized and exit the infiltrated, particle-filled preform. After pyrolyzing the high char-yielding component, the resultant article may be referred to as a green composite article.

The technique of FIG. 2 further includes infiltrating a molten metal or alloy into pores of the green composite article (30). The molten metal or alloy wicks between the ceramic particles, carbon, and inorganic fibers in the green composite article and occupies the interstices between the ceramic particles, carbon, and inorganic fibers until the green composite article is fully densified. In some examples, the fully densified article may include less than about 5 volume percent (vol. %), or less than about 3 vol. %, or less than about 1 vol. % of residual porosity. In various examples, the molten metal or alloy infiltrant includes Si, B, Al, Y, Ti, Zr, oxides thereof, and mixtures and combinations thereof.

In some examples, the temperature for molten metal or alloy infiltration may be between about 1400° C. and about 1500° C. In some examples, prior to infiltrating the molten metal or alloy into pores of the green composite article (30) the green composite article may be pre-heated to a temperature substantially equal (e.g., equal or nearly equal) to the temperature for molten metal or alloy infiltration so that the molten alloy or metal does not cool to form a solid upon contact with the green composite article. The duration of the infiltration may be between about 15 minutes and about 4 hours, or between about 60 minutes and about 120 minutes. The infiltration process can optionally be carried out under vacuum, but in other examples, may be carried out in inert gas under atmospheric pressure to limit evaporation losses.

In some examples, the molten metal or alloy infiltrant includes silicon. The silicon may react with carbon left by the high char-yielding component to form silicon carbide. The reaction between the silicon and carbon may reduce an amount of residual silicon in the final composite article compared to a composite article formed without the infiltration of the second solution described herein. Reduction of residual silicon in the final composite article may at least one of improve mechanical properties of the final composite article, improve surface finish of the final composite article, or reduce residual stress within the final composite article. In some examples, the reduction of residual silicon in the final composite article may be on the order of about 20 vol. % compared to a composite article formed without the infiltration of the second solution described herein. In some examples, the final composite article may include between about 8 vol. % and about 20 vol. % residual silicon metal (e.g., silicon not in a compound or alloy with another element). In some examples, the final composite article may include between about 8 vol. % and 10 vol. % residual silicon metal.

The amount of residual metal in the final composite article may depend upon one or more of a variety of factors, including, for example, the volume of inorganic fiber in the inorganic fiber porous preform, the thickness of any coatings applied to the inorganic fibers, the particulate loading in the first slurry composition, the amount of high char-yielding component deposited in the particle-filled preform, and the like. The reduction in residual metal in the final composite article may be due to reduction in volume into which the metal can infiltrate due to the presence of carbon, reaction between the carbon and metal to form metal carbide, or both.

In some examples, the amount of carbon in the green composite article may be selected so that substantially all (e.g., all or nearly all) of the carbon reacts with the molten metal during the metal or alloy infiltration step.

The final composite article may include substantially no macroscopic porosity, which in this application means pores with an average pore size of less than about 200 μm, or less than about 50 μm, or less than about 2 μm, and includes a porosity of less than about 5 vol. %, or less than about 3 vol. %, or less than about 1 vol. %.

In some examples, the final composite article may optionally be machined to form a suitable part for use in for example, a turbine engine or an aircraft engine.

EXAMPLES

Comparative Example

A SiC-fiber preform was fabricated by stacking 2D woven plys. The SiC-fiber preform was then coated with a boron nitride fiber-matrix interphase, and rigidized with silicon carbide using CVD/CVI. A vacuum was then pulled on the rigidized preform to evacuate any air from the remaining porosity, and a silicon carbide slurry including a multimodal distribution of silicon carbide particles, a dispersant to stabilize the slurry and reduce the viscosity, a pre-gellant system of monomers, and a free radical initiator was introduced until the rigidized preform was fully submerged. The vacuum was then removed such that a nominally 1 atmosphere pressure gradient existed to further enhance the slurry infiltration. While still submerged, the system was heated until the slurry gelled to the point that the slurry was rendered immobile. The article was dried through the assistance of elevated temperatures. The article was then heated to a point above the melting point of the infiltrant silicon alloy such that the silicon alloy was able to infiltrate the body through capillary wicking.

FIG. 2 is a cross-sectional micrograph of a comparative example SiC—SiC composite 40 formed without a secondary infiltration of a solution including a high char-yielding component. As shown in FIG. 2, SiC—SiC composite 40 included excess Si regions 42 and SiC regions 44.

Example

A SiC-fiber preform was fabricated by stacking 2D woven plys. The SiC-fiber preform was then coated with a boron nitride fiber-matrix interphase, and rigidized with silicon carbide using CVD/CVI. A vacuum was then pulled on the rigidized preform to evacuate any air from the remaining porosity, and a silicon carbide slurry including a multimodal distribution of silicon carbide particles, a dispersant to stabilize the slurry and reduce the viscosity, a pre-gellant system of monomers, and a free radical initiator was introduced until the rigidized preform was fully submerged. The vacuum was then removed such that a nominally 1 atmosphere pressure gradient existed to further enhance the slurry infiltration. While still submerged, the system was heated until the slurry gelled to the point that the slurry was rendered immobile. The article was dried through the assistance of elevated temperatures.

After drying, the article was then heated at 400° C. for 30 minutes to remove the polymeric binder and open the pores for the secondary infiltration. A polymer solution was mixed including the following constituents by weight: 85% furfuryl alcohol, 15% deionized water and enough 1M nitric acid to bring the solution to a pH of 2.0. This solution was infiltrated into the body by pulling a vacuum was then pulled on the rigidized preform to evacuate any air from the remaining porosity, fully submerging the preform in the polymer solution, and removing the vacuum. The system was then heated to 150° C. to gel the solution prior to component removal. The article was then removed and heated to 350° C. for 30 minutes to further set the polymer prior to pyrolysis. The pyrolysis process was then conducted as part of the melt-infiltration process. Heating was performed at a rate of 1° C. per min under vacuum up to 1200° C. when pyrolysis was completed. The article was then further heated to a point above the melting point of the infiltrant silicon alloy such that the silicon alloy was able to infiltrate the body through capillary wicking.

Figure 3:
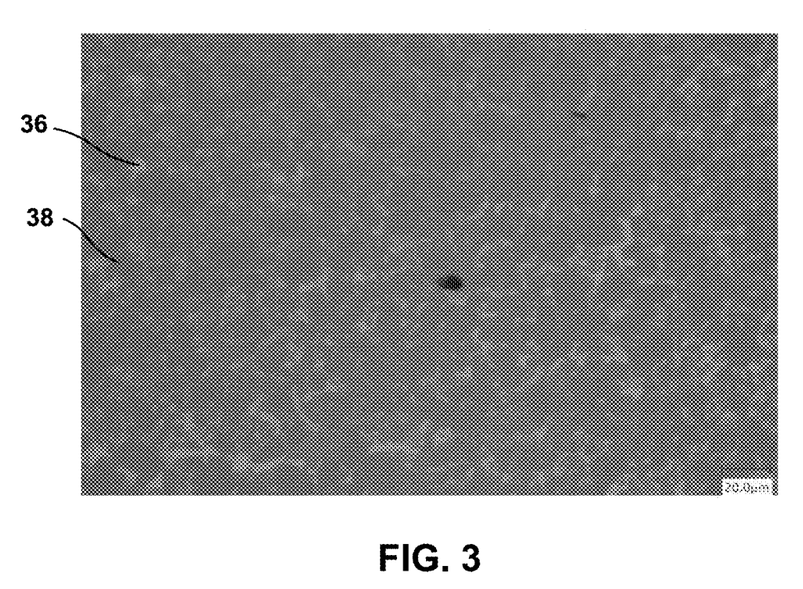
FIG. 3 is a cross-sectional micrograph of an example SiC—SiC composite formed with a secondary infiltration of a solution including a high char-yielding component.

FIG. 3 is a cross-sectional micrograph of an example SiC—SiC composite 50 formed with a secondary infiltration of a solution including a high char-yielding component. As shown in FIG. 3, SiC—SiC composite 50 included residual Si resions 36 and SiC regions 38. SiC—SiC composite 50 included less than about 5% porosity and approximately 40% less residual silicon than a SiC—SiC composite 40, which was produced without the secondary infiltration step.

Various examples have been described. These and other examples are within the scope of the following claims.

The invention claimed is:

1. A method comprising:
impregnating an inorganic fiber porous preform with a first slurry composition, wherein the first slurry composition comprises ceramic particles, a solvent, and a pre-gellant material;
initiating gelation of the pre-gellant material in the first slurry composition to substantially immobilize the particles and yield a gelled article;
heating the gelled article to substantially remove the gel and open pores;
impregnating the open pores with a second solution, wherein the second solution is different from the first slurry composition, and comprises a high char-yielding component, wherein the second solution does not comprise ceramic particles, and wherein the first slurry composition does not include the high char-yielding component;
pyrolyzing the high char-yielding component to yield carbon and form a green composite article; and
infiltrating the green composite article with a molten metal or alloy to form a final composite article, wherein at least some of the molten metal or alloy reacts with the carbon to form a metal carbide.

2. The method of claim 1, wherein the high char-yielding component comprises at least one of furfuryl alcohol or a phenolic material.

3. The method of claim 1, wherein the second solution further comprises at least one of a second solvent, a polymer interrupter, an acid catalyst, and a secondary polymer.

4. The method of claim 3, wherein the second solvent comprises water.

5. The method of claim 3, wherein the polymer interrupter comprises an alcohol.

6. The method of claim 3, wherein the acid catalyst comprises at least one of nitric acid, hydrochloric acid, or paratoluene sulfonic acid (PTSA).

7. The method of claim 3, wherein the secondary polymer comprises at least one of poly(ethylene glycol), polyvinyl alcohol (PVA), or polyvinyl pyrollidone (PVP).

8. The method according to claim 3, wherein the inorganic fiber preform comprises at least one coating comprising at least one of carbon, aluminum nitride, boron nitride, silicon nitride, silicon carbide, boron carbide, a metal boride, a transition metal silicide, a transition metal oxide, a transition metal silicate, or a rare earth metal silicate.

9. The method of claim 1, further comprising, after impregnating the gelled article with the second solution, heating the gelled article including the second solution to polymerize the high char-yielding component.

10. The method according to claim 1, wherein the pre-gellant material comprises at least one of a monomer that is polymerized to form a gel or a polysaccharide.

11. The method according to claim 1, wherein the inorganic fiber preform comprises fibers comprising at least one of aluminum oxide ($Al_2O_3$), mullite ($Al_6Si_2O_{13}$), zirconium oxide ($ZrO_2$), carbon (C), graphite, silicon carbide, silicon carbonitride, or silicon nitride.

12. The method according to claim 1, where the particles in the first slurry composition comprises at least one of aluminum nitride, aluminum diboride, boron carbide, aluminum oxide, mullite, zirconium oxide, carbon, silicon carbide, silicon nitride, a transition metal nitride, a transition metal boride, a transition metal oxide, a transition metal silicate, or a rare earth oxide.

13. A method comprising:
impregnating a silicon carbide fiber porous preform with a first slurry composition, wherein the first slurry composition comprises silicon carbide particles, a solvent, and a pre-gellant material;
initiating gelation of the pre-gellant material in the first slurry composition to substantially immobilize the silicon carbide particles and yield a gelled article;
heating the gelled article to substantially remove the gel and open pores while leaving silicon carbide particles in the silicon carbide fiber porous preform;
impregnating the open pores with a second solution, wherein the second solution is different from the first slurry composition, and comprises furfuryl alcohol, wherein the second solution does not comprise ceramic particles, and wherein the first slurry composition does not include a high char-yielding component;

pyrolyzing the furfuryl alcohol to yield carbon and form a green composite article; and infiltrating the green composite article with a molten material infiltrant comprising silicon to form a final composite article, wherein at least some of the silicon reacts with the carbon to form silicon carbide.

14. The method of claim 13, further comprising, after impregnating the gelled article with the second solution, heating the gelled article including the second solution to polymerize the furfuryl alcohol.

15. The method of claim 13, further comprising, after heating the gelled article including the second solution to polymerize the furfuryl alcohol, heating the gelled article including polymerized furfuryl alcohol to substantially remove other components of the second solution.

16. The method of claim 13, wherein the second solution further comprises a second solvent, a polymer interrupter, an acid catalyst, and a secondary polymer.

17. The method of claim 16, wherein the second solvent comprises water, the polymer interrupter comprises an alcohol, the acid catalyst comprises nitric acid, and the secondary polymer comprises polyethylene glycol.

* * * * *